United States Patent [19]

Childers et al.

[11] Patent Number: 5,099,380
[45] Date of Patent: Mar. 24, 1992

[54] ELECTRICAL CONNECTOR WITH OVERVOLTAGE PROTECTION FEATURE

[75] Inventors: Richard K. Childers; John H. Bunch; Karen P. Shrier, all of San Mateo County, Calif.

[73] Assignee: Electromer Corporation, Castro Valley, Calif.

[21] Appl. No.: 510,978

[22] Filed: Apr. 19, 1990

[51] Int. Cl.⁵ .............................. H02H 9/04
[52] U.S. Cl. ...................... 361/56; 361/111; 439/620
[58] Field of Search .............. 361/56, 91, 127, 111, 361/119; 428/329; 439/620

[56] References Cited

U.S. PATENT DOCUMENTS

| | | | |
|---|---|---|---|
| 4,587,589 | 5/1986 | Marek | 361/119 |
| 4,635,158 | 1/1987 | Riley | 361/127 |
| 4,726,991 | 2/1988 | Hyatt et al. | 428/329 |
| 4,729,752 | 3/1988 | Dawson, Jr. et al. | 361/56 |
| 4,813,891 | 3/1989 | Walters et al. | 439/620 |
| 4,920,443 | 4/1990 | Shepherd | 361/111 |
| 4,928,199 | 5/1990 | Diaz et al. | 361/111 |
| 4,977,357 | 12/1990 | Shrier | 338/21 |
| 5,008,770 | 4/1991 | Hilland | 361/56 |

*Primary Examiner*—Todd E. DeBoer
*Attorney, Agent, or Firm*—Flehr, Hohbach, Test, Albritton & Herbert

[57] ABSTRACT

A connector is disclosed which includes a plurality of leads and a conductive plate. The plate includes a number of bores extending through it. The leads are spaced apart the walls of the bores. A quantum mechanical tunneling material is placed between the leads and the walls of the bores in order to support the leads. This configuration serves to connect the leads to the plate by quantum mechanical tunneling when the voltage between the leads and the plate exceeds a predetermined voltage.

5 Claims, 5 Drawing Sheets

ELECTRICAL CONNECTOR WITH OVERVOLTAGE PROTECTION FEATURE

BRIEF DESCRIPTION OF THE INVENTION

This invention relates generally to transient overvoltage protection devices. More particularly, it relates to electrical connectors with an overvoltage protection feature.

BACKGROUND OF THE INVENTION

All types of conductors are subject to transient voltages which potentially disable unprotected electronic and electrical equipment. Transient incoming voltages can result from lighting, electromagnetic pulses, electrostatic discharges, or inductive power surges.

More particularly, transients must be eliminated from electrical connectors commonly used in radar, avionics, sonar and broadcast. The need for adequate protection is especially acute for defense, law enforcement, fire protection, and other emergency equipment. A present approach to suppressing transients in connectors is to use silicon p-n junction devices. The p-n junction device is mounted on the connector contact; it serves as a dielectric until the voltage surge reaches a sufficient value to generate avalanche multiplication. Upon avalanche multiplication, the transient is shunted through the silicon device to the connector housing.

Several problems are associated with this prior art solution and other approaches which analogously use Zener diodes, varistors, and gas discharge tubes. Mounting the devices on the connector is difficult. Similarly, since the discrete devices are mounted to one another, they may not withstand hostile physical environments. Also, prior art devices are relatively heavy.

The electrical characteristics of prior art devices allow for improvement. An ideal device would have the capability of handling high energy and possess a response time in the sub-nanosecond range.

OBJECTS AND SUMMARY OF THE INVENTION

It is a general object of the present invention to provide an overvoltage protection apparatus.

It is a related object of the invention to provide an overvoltage protection apparatus which is not mounted on a conductor, but is moldably designed with the conductor.

A related object of the invention is to provide an overvoltage protection apparatus which eliminates discrete connection with the conductor and thereby provides a moldable and rugged design.

A further related object of the present invention is to provide an overvoltage protection apparatus which is lightweight.

Another object of the invention is to provide an overvoltage protection apparatus capable of handling high energy.

Yet another object of the invention is to provide an overvoltage protection apparatus with a sub-nanosecond response time.

These and other objects are achieved by a connector which includes a plurality of leads and a conductive plate which includes a number of bores extending through it. The leads are spaced from the walls of the bores. A quantum mechanical tunneling material is placed between the leads and the walls of the bores in order to support the leads. This configuration serves to connect the leads to the plate by quantum mechanical tunneling when the voltage between the leads and the plate exceeds a predetermined voltage.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
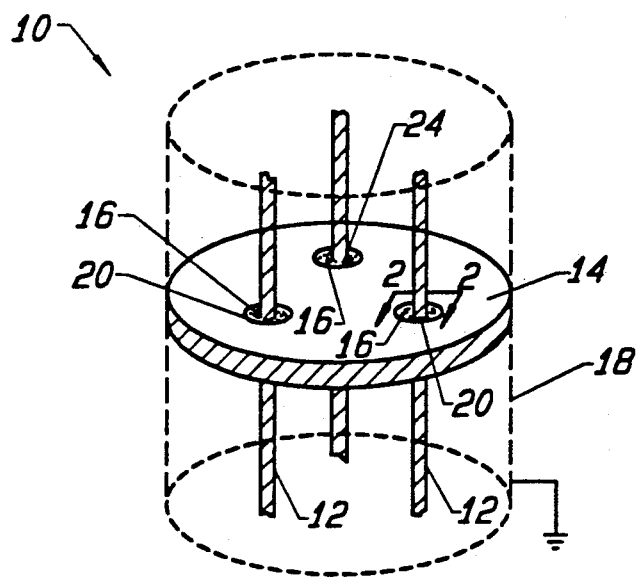
FIG. 1 is a perspective view of a simplified connector using the apparatus of the present invention.

Turning now to the drawings, wherein like components are designated by like reference numerals in the various figures, attention is initially directed to FIG. 1. A simplified power connector 10 is depicted therein. The connector 10 includes a number of leads 12 and a conductive plate 14. The conductive plate 14 includes a number of bores 16. The conductive housing 18 is shown in phantom. Composite material 20 is positioned between the leads 12 and the bores 16 of the conductive plate 14 in such a manner as to support the leads 12.

This simplified connector discloses the nature of the present invention. Of course those skilled in the art appreciate that a connector may include a number of components not disclosed herein, for instance, seals, grommets, shells, couplings, springs, and washers. Similarly, those skilled in the art will appreciate that connectors are used in a variety of voltage ranges and therefore they are configured for their specific application. For instance, in industrial applications such as portable welding equipment, construction equipment, and maintenance equipment, connectors operate in the range between 50 and 200 amps and up to 600 volts. Alternatively, mining equipment, airport runway lighting, and petrochemical industry equipment employs special environment connectors operating between 200 and 800 amps and 600 to 1000 volts. It will be appreciated by those skilled in the art that the invention disclosed herein is applicable in all of these applications.

Figure 2:
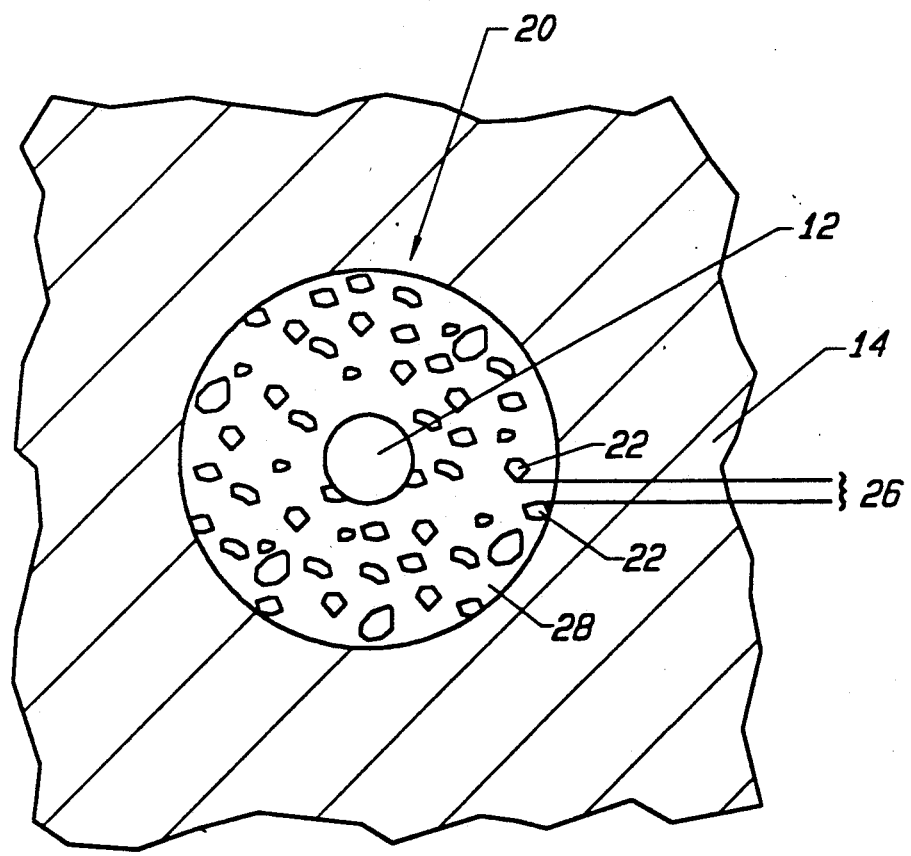
FIG. 2 is an enlarged cross-sectional view of a bore, lead, and overvoltage protection material from a connector taken along the line 2—2 of FIG. 1.

Turning to FIG. 2, depicted therein is an enlarged cross-sectional view of the overvoltage protection device of FIG. 1, taken along the line 2—2. The figure discloses the precise nature of the composite material 20. Particularly, the figure discloses that the material 20 includes a number of particles 22 positioned within binder 28. The distance between particles 22 is depicted by space 26. The on-state resistance and the off-state resistance of the material 20 are determined by the inter-particle spacing 26 within the binder 28 as well as by the electrical properties of the insulating binder 28.

As the FIG. 2 suggest, the overvoltage protection apparatus of the present invention has a moldable design. As a result of this moldable design, the material is readily positioned contiguous with lead 12 and within bores 16.

This moldable design obviates problems in the prior art with mounting discrete elements such as diodes and varistors on a conductor. These prior art connections between the conductor and the discrete elements are not as rugged as the unitary moldable design of the present invention.

Figure 3:
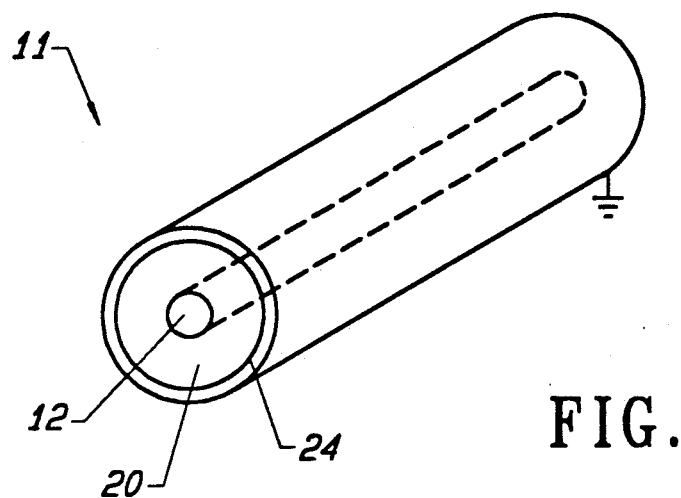
FIG. 3 is a perspective view of a simplified embodiment of the overvoltage protection apparatus of the present invention.
Figure 4:
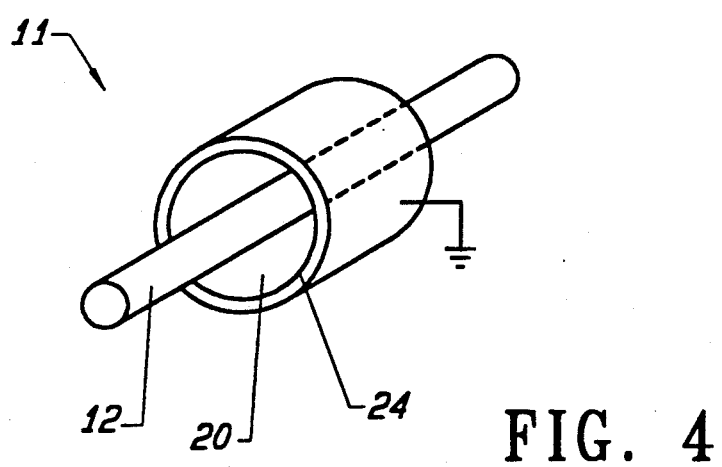
FIG. 4 is a perspective view of an alternate simplified embodiment of the overvoltage protection apparatus of the present invention.

This moldable feature allows for simplified embodiments separate from embodiments relating to connectors 10. FIGS. 3 and 4 depict such embodiments. The device 11 includes a lead 12 which is surrounded by composite material (concentric member) 20. The composite material 20 is surrounded by a conductor jacket (second conductor) 24. The figures depict that the conductor jacket 24 is grounded. In FIG. 4, the conductor jacket 24 extends along a portion of the length of the axial conductor or lead 12.

Regardless of the particular embodiment utilized, the invention operates in the same manner. A transient on lead 12 induces the composite material 20 to switch from a high-resistance state to a low-resistance state thereby largely clamping the voltage to a safe value and shunting excess electrical current from the lead 12 through the composite material 20, through the second conductor 24 (or conductive plate 14) to system ground.

Electrically, the binder 28 serves two roles: first it provides a media for tailoring separation between conductive particles, thereby controlling quantum mechanical tunneling; second, as an insulator it allows the electrical resistance of the homogenous dispersion to be tailored.

During normal operating conditions and within normal operating voltage ranges, with the material 20 in the off-state, the resistance is quite high. Typically, it is either in the range required for bleed-off of electrostatic charge, ranging from one hundred thousand ohms to ten mega-ohms or more, or it is in a high resistance state in the 10 (to the 9th) ohm region.

Conduction by static bleed in the off-state and conduction in response to an overvoltage transient is primarily between closely adjacent conductive particles 22 and results from quantum mechanical tunneling through the binder 28 separating the particles. The electrical potential barrier for electron conduction between two particles 22 is determined by the separation distance 26 and the electrical properties of the insulating binder material 28. In the off-state this potential barrier is relatively high and results in a high electrical resistivity for the non-linear material. The specific value of the bulk resistivity can be tailored by adjusting the volume percent loading of the conductive particles in the binder, their particle size and shape, and the composition of the binder itself. For a well-blended, homogenous system, the volume percent loading determines the inter-particle spacing.

Application of a high electrical voltage to the material 20 dramatically reduces the potential barrier to inter-particle conduction and results in greatly increased current flow through the material via quantum-mechanical tunneling. This low electrical resistance state is referred to as the on-state of the non-linear material. The details of the tunneling process and the effects of increasing voltages on the potential barriers to conduction are described by the quantum-mechanical theory of matter at the atomic level, as is known in the art. Because the nature of the conduction is primarily quantum mechanical tunneling, the time response of the material to a fast rising voltage pulse is very quick. The transition from the off-state resistivity to the on-state resistivity takes place in the sub-nanosecond regime.

By way of example, if the diameter of the device in FIG. 4 is 0.02 inches (the conductors being spaced approximately 0.01 inches apart), a clamping voltage of 200 volts to 400 volts, an off-state resistance of ten mega-ohms at ten volts, and a clamp time less than one nanosecond may be achieved. Other clamping voltage specifications can be met by adjusting the thickness of the material formulation, or both.

An example of the material formulation, by weight, for the particular embodiment shown in FIG. 4 is 35% polymer binder, 1% cross linking agent, and 64% conductive powder. In this formulation the binder is Silastic 35 U silicon rubber, the crosslinking agent is Varox peroxide, and the conductive powder is nickel powder with 10 micron average particle size. The table shows the electrical properties of a device made from this material formulation.

| Electrical Resistance in off-state (at 10 volts) | 10 (to the 7th) ohms |
|---|---|
| Electrical Resistance in on-state | 20 ohms |
| Response (turn-on) time | <5 nanoseconds |
| Capacitance | <5 pico-farads |

Those skilled in the art will understand that a wide range of polymer and other binders, conductive powdes, formulations and materials are possible. Other conductive particles which can be blended with a binder to form the non-linear material in this invention include metal powders of aluminum, beryllium, iron, gold, silver, platinum, lead, tin, bronze, brass, copper, bismuth, cobalt, magnesium, molybdenum, palladium, tantalum, tungsten and alloys thereof, carbides including titanium carbide, boron carbide, tungsten carbide, and tantalum carbide, powders based on carbon including carbon black and graphite, as well as metal nitrides and metal borides.

The primary function of the binder is to establish and maintain the inter-particle spacing of the conducting particles in order to ensure the proper quantum mechanical tunneling behavior during application of an electrical voltage. Accordingly, insulating binders can include but are not limited to organic polymers such as polyethylene, polypropylene, polyvinyl chloride, natural rubbers, urethanes, and epoxies, silicone rubbers, fluoropolymers, and polymer blends and alloys. Other insulating binders include ceramics, refractory material, waxes, oils, and glasses While substantially an insulator, the binder's resistivity can be tailored by adding or mixing various materials which alter its electrical properties. Such materials include powdered varistors, organic semiconductors, coupling agents, and antistatic agents.

A wide range of formulations can be prepared following the above guidelines to provide clamping voltages from fifty volts to fifteen thousand volts. The interparticle spacing, determined by the particle size and volume percent loading, and the device thickness and geometry govern the final clamping voltage.

Figure 5:
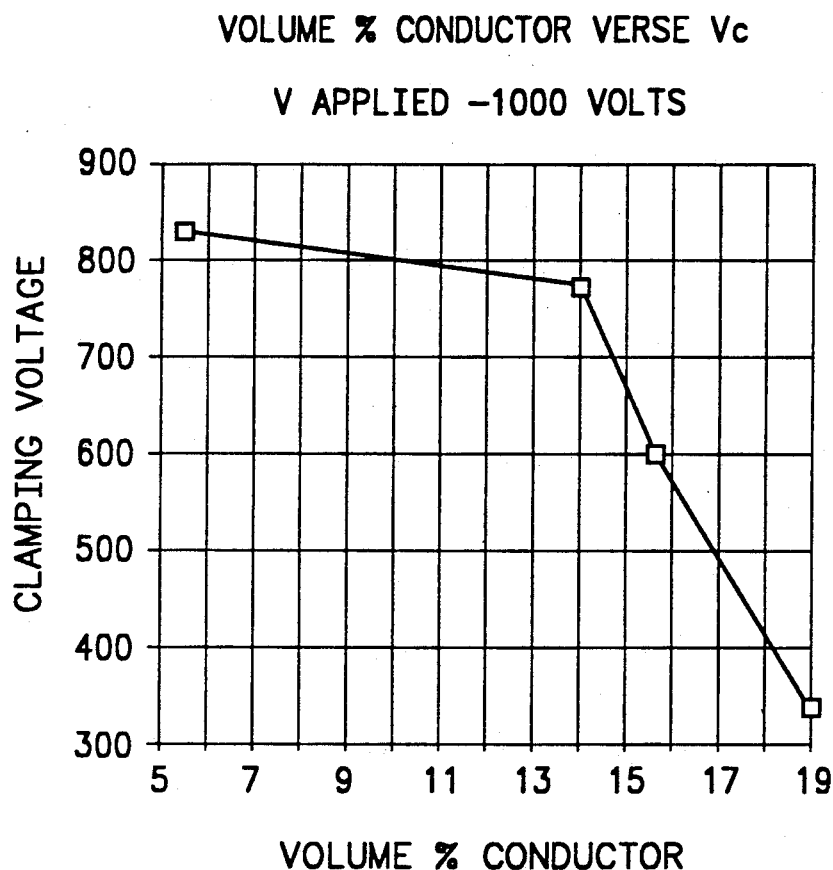
FIG. 5 is a graph of clamp voltage versus volume percent conductive particles for the overvoltage protection material of the present invention.

Referring to FIG. 5, depicted therein is Clamping Voltage as a function of Volume Percent Conductor for materials of the same thickness and geometry, and prepared by the same mixing techniques as heretofore described. The off-state resistance of the devices are all approximately ten mega-ohms. The on-state resistance of the devices are in the range of 10 to 20 ohms, depending upon the magnitude of the incoming voltage transient.

Figure 6:
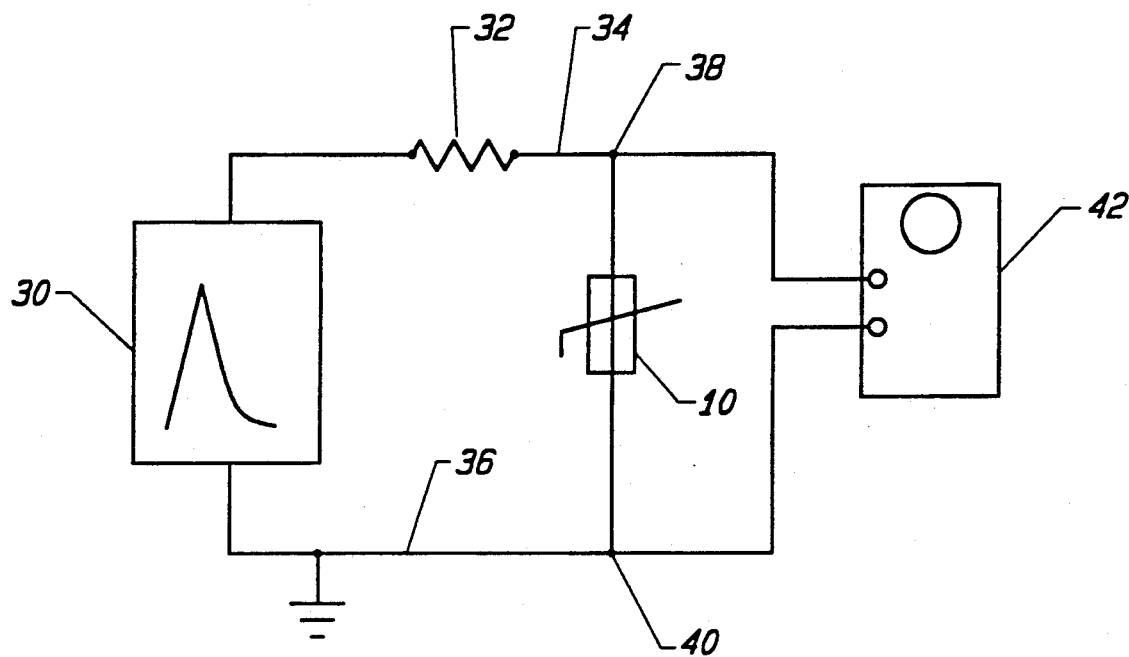
FIG. 6 is an example test circuit for measuring the overvoltage response of a simplified embodiment of the present invention.

FIG. 6 shows a test circuit for measuring the electrical response of a device made with materials of the present invention. A fast rise-time pulse, typically one to five nanoseconds, is produced by pulse generator 30. The output impedance 32 of the pulse generator is fifty ohms. The pulse is applied to the overvoltage protection apparatus 11 which is connected between the high voltage line 34 and the system ground 36. The voltage versus time characteristics of the non-linear device are measured at points 38, 40 with a high speed storage oscilloscope 42.

Figure 7:
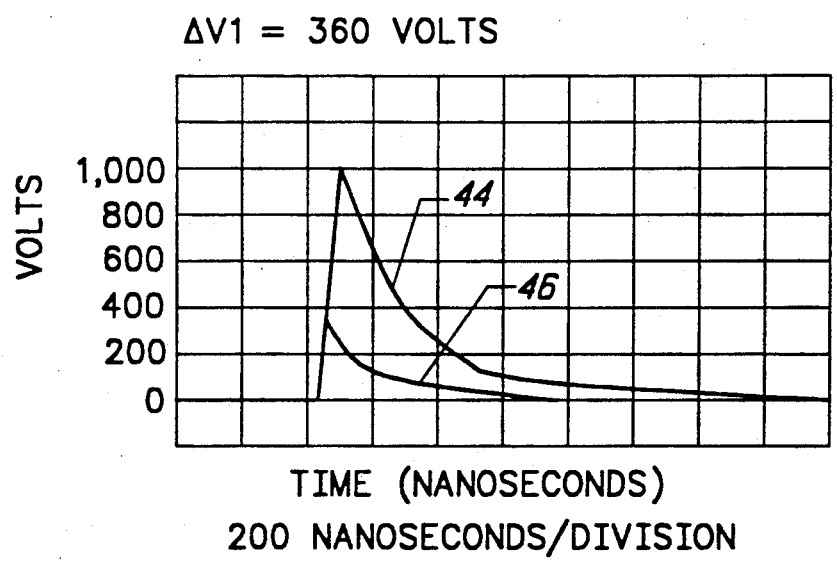
FIG. 7 is a graph of voltage versus time for a transient overvoltage pulse applied to a simplified embodiment of the present invention.

Referring now to FIG. 7, the typical electrical response of device 11 tested in FIG. 6 is depicted as a graph of voltage versus time for a transient overvoltage pulse applied to the device 11. In the figure, the input pulse 44 has a rise time of five nanoseconds and a voltage amplitude of one thousand volts. The device response 46 shows a clamping voltage of 360 volts in this particular example. The off-state resistance of the device tested in FIG. 7 is eight mega-ohms. The on-state resistance in its non-linear resistance region is approximately 20 ohms to 30 ohms.

Figure 8:
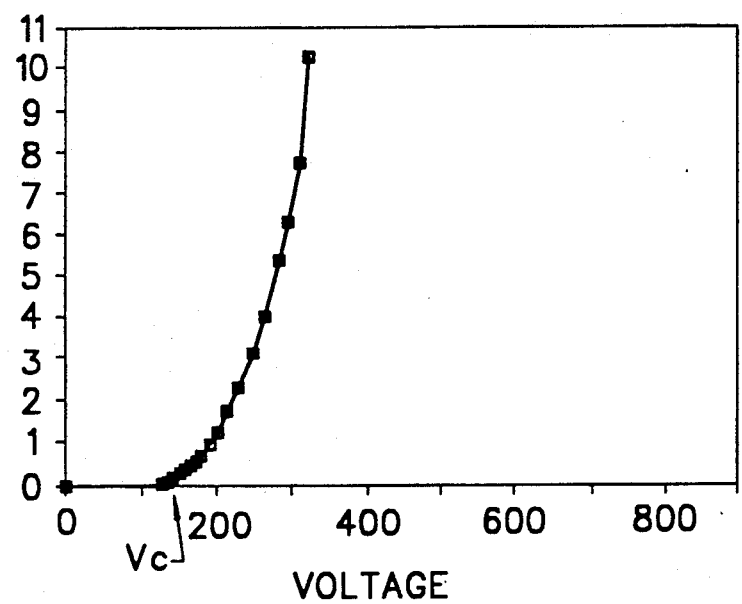
FIG. 8 is a graph of current versus voltage for a simplified embodiment of the present invention.

FIG. 8 depicts the current-voltage characteristics of a device made from the present invention. The highly non-linear nature of the material used in the invention is readily apparent from the figure. Specifically, below the threshold voltage Vc the resistance is constant, or ohmic, and very high, typically 10 mega-ohms for applications requiring static bleed, and 10 (to the 9th) ohms or more for applications which do not require static bleed. On the other hand, above the threshold voltage Vc the resistance is extremely voltage dependent, or non-linear, and can be as low as approximately 10 ohms to 30 ohms for devices made from the present invention.

The process for fabricating the material of the present invention includes standard polymer processing techniques and equipment. A preferred process uses a two roll rubber mill for incorporating the conductive particles into the binder material. The polymer material is banded on the mill, the crosslinking agent (if required) is added, and then the conductive particles are added slowly to the binder. After complete mixing of the conductive particles into the binder, it is sheeted off the mill rolls. Other polymer processing techniques can be used including Banbury mixing, extruder mixing and other similar mixing equipment.

Thus, it is apparent that there has been provided, in accordance with the invention, an overvoltage protection device that fully satisfies the objects, aims and advantages set forth above. While the invention has been described in conjunction with specific embodiments thereof, it is evident that many alternatives, modifications, and variations will be apparent to those skilled in the art in light of the foregoing description.

What is claimed:

1. A high performance connector of the type which includes:
    a plurality of leads;
    a conductive plate;
    a plurality of bores extending through said plate, said leads extending through and spaced from the walls of said bores; and
    a moldable quantum mechanical tunneling material integrally disposed between said leads and said bore walls to support the leads and serving to directly connect the leads to the plate by quantum mechanical tunneling when the voltage between said leads and said plate exceeds a predetermined voltage.

2. An overvoltage protection apparatus comprising:
    an elongated axial conductor;
    a moldable concentric member formed from nanosecond responsive overvoltage protection material, said member positioned contiguous with said elongated axial conductor, said member composed of a matrix formed of only closely spaced, homogeneously distributed, conductive particles, said particles being in the range of 10 microns to two hundred microns and spaced in the range of 25 angstroms to 350 angstroms to provide quantum mechanical tunneling therebetween and a binder selected to provide a quantum mechanical tunneling media and predetermined resistance between said conductive particles; and
    a conductive jacket contiguous with said member, said conducting jacket connected to ground, whereby excessive voltage on said elongated annular conductor generates a nanosecond responsive quantum mechanical tunneling within said overvoltage protection material, thereby switching said material from a high-resistance state to a low-resistance state and largely clamping said voltage while shunting excess current from said elongated annular conductor to ground.

3. An overvoltage protection apparatus comprising:
    an elongated axial conductor;
    a concentric member formed from nanosecond responsive overvoltage protection material, said member positioned contiguous with said elongated axial conductor, said member composed of a matrix formed of only closely spaced, homogeneously distributed, conductive particles, said particles being in the range of 10 microns to two hundred microns and spaced in the range of 25 angstroms to 350 angstroms to provide quantum mechanical tunneling therebetween and a binder selected to provide a quantum mechanical tunneling media and predetermined resistance between said conductive particles; and
    a conductor jacket concentric with said member, said conducting jacket connected to ground, whereby excessive voltage on said elongated annular conductor generates a nanosecond responsive quantum mechanical tunneling within said overvoltage protection material, thereby switching said material from a high-resistance state to a low-resistance state and largely clamping said voltage while shunting excess current from said elongated annular conductor to ground.

4. The apparatus of claim 3 wherein said second conductor is tubular and extends along the length of said first conductor.

5. The apparatus of claim 3 wherein said second conductor is tubular and extends along a portion of the length of said first conductor.

* * * * *